3,827,869
PRODUCTION OF FOAMED SILICATE MOLDINGS WHERE THE FOAMABLE COMPOSITION IS GELLED PRIOR TO FOAMING
Wulf von Bonin, Leverkusen, Germany, assignor to Bayer Aktiengesellschaft, Leverkusen, Germany
No Drawing. Filed Feb. 15, 1973, Ser. No. 332,828
Claims priority, application Germany, Mar. 7, 1972, P 22 10 837.8
Int. Cl. C03b 19/08
U.S. Cl. 65—22                9 Claims

ABSTRACT OF THE DISCLOSURE

The present invention relates to a process for the production of foaming moldings having a silicate skeleton which comprises mixing in aqueous solution containing a water soluble silicate, a gelling agent and a foaming agent which liberates a volatile substance above about 70° C., converting said mixture into a gel and then foaming said gel by heating it above 70° C. It is preferred to use as silicate solution a sodium waterglass solution, as gelling agent chloroformic acid esters and as foaming agents petrol, light petrol or petrol ether.

---

This invention relates to a process for the production of foam moldings based on silicates by the thermal foaming of aqueous silicate gels containing expanding agents.

It is known that certain natural silicates containing water or even sodium silicates containing water of hydration can be expanded at high temperatures. In this case, it is the evaporating water which causes the materials to expand. After expansion, the materials are in the form of a voluminous, fragmented product, or a loose powder or a vesicular coating on a substrate.

The process according to this invention relates to the production of foams based on silicates having an adjustable, relatively uniform pore size and a substantially closed pore structure which can be obtained in the form of self-supporting moldings of substantially any shape and size.

In this process, it is possible either to form a prefabricated, silicate-based molding of a gel, for example a panel, or alternatively to fill a given mold with the silicate material, for example in granulate form, and then to carry out the foaming process. In the latter case the granulate particles weld together and, by foaming and filling the mold, give a substantially homogeneous foam molding.

Accordingly, this invention provides a process for the production of foam moldings based on silicates which is distinguished by the fact that an aqueous silicate solution optionally containing other inorganic and/or organic additives is converted into a gel in which expanding agents are incorporated and the gel is subsequently foamed by heating to a temperature above 70° C.

The invention also relates to foam moldings which may be in water-free or water-containing form produced by the process according to the invention. Such moldings also include porous moldings.

In the context of the invention, moldings are defined as any three dimensional structures in the broader sense. Thus, moldings also include, for example, coatings, bonds, network, joints, seals and fillings of any kind.

Suitable aqueous silicate solutions include solutions of silicates in water or aqueous media which can have both the character of genuine solutions and also the character of colloidal solutions, for example ammonium silicates or metal silicates. Silica sols containing alkali, e.g. alkali metal hydroxides, carbonates or the like, are also suitable.

It is preferred to use alkali metal silicate solutions, for example sodium and/or potassium silicate solutions. So-called waterglass solutions which have been commercially available for some time represent a very suitable starting material. However, the dissolved silicate does not necessarily have to correspond to the formula:

$$Na_2O \cdot 3\text{--}4SiO_2$$

on which waterglass, for example, is based.

The ratios of the alkali metal oxide to $SiO_2$ can vary for example from $Na_4SiO_4$ up to polysilicates which differ widely in their degree of polymerization in which the ratio of alkali metal oxide to $SiO_2$ is less than about 1:1, for example 0.1:1. However, it is essential to use a free-flowing silicate solution. The upper limit to the concentration of these soltuions, being about 60%, is imposed by the necessary fluidity of the solutions although it would also be possible, for example, to process more highly concentrated solutions, for example, in kneading units, at elevated temperatures. The lower limit to the concentration range is imposed by the fact that solutions having a content of less than about 5% dissolved silicate generally only produce gels of unsatisfactory strength. Accordingly, it is preferred to use solutions having a silicate content in the range of about 10 to 50% by weight.

Suitable additional inorganic or organic additives are those of the kind which as is gas, liquid or solid state, can be either soluble or insoluble in the silicate solution provided that they are compatible, in other words providing they do not cause the silicate solution to precipitate under the mixing conditions.

These additives can be fillers, diluents or special auxiliaries.

Examples of suitable fillers are solid inorganic or organic substances in the form of for example powders, granulates, wire, fibers, dumb bells, crystallites, spirals, rods, beads, hollow beads, foam particles webs, pieces of woven and nitted fabric, ribbons and pieces of film, for example of dolomite, chalk, alumina, asbestos, basic silicas, sand, talcum, iron oxide, magnesium- or aluminum oxide and oxide hydrates, alkali silicates, zeolites, mixed silicates, calcium silicates, calcium sulphates, alumo silicates, cements, basal wool or powder, glass fibers, C-fibers, glass powder, graphite, carbon black, Al—, Fe—, Cu—, Ag-powder, molybdenum sulfide, steel wool, bronze or copper cloth, silicon powder, expanded clay particles, hollow glass beads, perlite, vermiculite, lava and pumice particles, wood chips, sawdust, cork, cotton, straw, popcorn, coke, particles of filled or unfilled, foamed or unfoamed, stretched or unstretched organic polymers. Of the whole number of suitable organic polymers, the folowing few, for example in the form of powders, granulate, foam particles, beads, hollow beads, foamable or unfoamed particles, fibers, ribbons, woven fabrics and webs, are mentioned by way of example: polystyrene, polyethylene, polypropylene, polyacrylonitrile, polybutadiene, polyisoprene, polytetrafluoroethylene, aliphatic and aromatic polyesters, melamine-urea or phenol resins, polyacetal resins, polyepoxides, polyhydantoins, polyureas, polyethers, polyurethanes, polyimides, polyamides, polysulfones, polycarbonates, and of course any copolymers providing that they are compatible with the silicate solutions. Fillers that should be emphasized include dolomite, chalk, talcum, glass in any form, carbon, polystyrene, polyvinyl chloride and polyethylene in foamed and unfoamed form, terephthalic acid polyester, polyacrylonitrile, polyamides, polypropylene, polyurethanes in the form of fibers, webs, woven fabrics or foams.

In one particular embodiment of the process according to the invention, it is also possible to use the preliminary stages of the solid polymers in solid or liquid form as additives or fillers, providing they are compatible with the silicate solutions, being polymerised and hardened through corresponding reactions which may be carried out during or after the gelling process. For example styrene, mixtures of syrene and unsaturated monomers, for example maleic acid polyesters, diallyl phthalate or methylmethacrylate or soltuions of monomers in polymers, are suitable for this purpose.

Examples of other substances which are suitable for this purpose include melamine, urea, phenols or other substances, for example amines, which together with other reactive components which, like formaldehyde or certain isocyanates are compatible with the silicate solutions and can also be added to them, optionally induce a hardening process or polymerization, polycondensation or polyaddition process which takes place in addition to hardening of the silicate solution.

Compatible gaseous additives to the silicate solutions can also be regarded as voluminous fillers in the context of the process according to the invention. Gases of this kind, preferably including air, but also oxygen, nitrogen, $SF_6$, hydrogen, noble gases, methane and $CF_4$, can be added to the silicate solutions optionally in admixture with the other additives either in the absence of pressure or under excess pressure. In this case, it is advantageous additionally to use foam-forming and foam-stabilizing auxiliaries of the kind described further below.

According to the invention, it is possible in this way to obtain foamable silicate gels to which the gases and also the other fillers, diluents or other auxiliaries, i.e. the additives, can be added either completely or in part in one or more operations before, during or immediately after addition of the additives which induce the gelling reaction.

In general, the additives classed as fillers may be added in up to about 85% by weight of the reaction mixture, preferably within the range of about 0.5 to 50% by weight.

Diluents represent other suitable additives. The diluents can be either aqueous or non-aqueous diluents.

In addition to the use of polymer solutions, for example polystyrene, polyesters or rubber in gasoline, benzene or chloroform, or phenol-, urea- or melamine-formaldehyde precondensates in water, the use of polymer dispersions as diluents represent a borderline case so far as the fillers are concerned. Suitable polymer dispersions are those which can be obtained by conventional processes but which must be compatible with the silicate solutions in two respects. first they should not precipitate the silicate from solution and second they themselves should not be precipitated by the silicate solutions. This requirement is satisfied by a number of commercially available or conventionally obtainable dispersions of polyurethanes, polyvinyl acetate, polystyrene, polybutadiene, polyacrylates, polyacrylonitrile, polyethylene, polyvinyl chloride or their copolymers, although it should be checked in each case by simple preliminary tests because it is often governed by the choice of emulsifier. These diluents can be used in such quantities that the mixtures have a silicate content of greater than about 5% by weight and preferably about 10 to 50% by weight.

It is also possible to use other diluents in substantially the same ratio, for example aqueous formaldehyde solution, $H_2O_2$-solutions or paraformaldehyde or diluents which are insoluble in the silicate solution and which can also be used as diluents for the gelling agents to be used at a later stage, their compatibility again being an essential requirement. Examples of diluents such as these are aliphatic and aromatic hydrocarbons such as benzene, toluene, xylene, styrene, gasolines, paraffin oil, paraffin wax, fatty acid esters, diethylcarbonate, diethylphthalate, silicones, triethylphosphate, ethylbenzoate, butyl acetate, orthoformic acid ethyl esters, oleic acid glycerides, chlorinated hydrocarbons such as halomethanes, perchlorethylene, chlorobenzene, fractions of natural oils, petroleum cuts and bitumen.

These diluents may optionally also comprise compounds added as expanding agents which are predominantly volatile organic substances having boiling points of from −20 to 200° C., preferably about 15° C. to 150° C., and which are preferably insoluble in the silicate solution. Examples of substances such as these are saturated or unsaturated hydrocarbons having 3 to 12 carbon atoms such as propane, isobutylene, butadiene, isoprene, butane, pentane, heptane, octane, isooctane, cyclohexane, petrol fractions, light petrol, white spirit, petroleum ether, benzene, toluene, xylene, halogenated saturated or unsaturated hydrocarbons such as methyl chloride, methylene chloride, chloroform, $CCl_4$, fluorotrichloromethane, difluorodichloromethane, trifluorochloromethane, chloroethane, vinyl chloride, vinylidene chloride, dichloroethane, trichloroethylene and perchlorethylene.

Other suitable expanding agents include inorganic or organic compounds or mixtures which liberate volatile substances at temperatures above 70° C., for example azides, azo compounds, nitrates, nitrites, nitroso compounds, (thio) triazoles, azodicarbonamides, hydrazo compounds, sulfohydrazides, and also compounds which liberate CO, oxygen, hydrogen or other gases. Azodicarbonamide, diphenylsulfone-3,3'-disulfohydrazide, azodiisobutyronitrile and its derivatives, are mentioned by way of example.

The function of these expanding agents is to convert the gelled reaction mixture into a foam during an afterheating process. These expanding agents can be used either individually or in admixture with one another. It is preferred to use aliphatic (halogenated) hydrocarbons, for example $CCl_4$, $CHI_3$, $CH_2Cl_2$, $C_2HCl_3$, $C_2Cl_4$, petroleum ether, light gasoline and other gasoline fractions.

The expanding agents are used in quantities of greater than about 0.01% by weight and preferably in quantities of about 0.5 to 20% by weight, based on the reaction mixture.

In addition to dyes, odorants and thickeners, such as methylcellulose, starch, water-proofing agents such as silicones or fluorinated compounds, wetting agents, foam stabilizers, pore regulators and ionic or non-ionic emulsifiers are mentioned in particular as special auxiliaries from the group of inorganic or organic auxiliaries. Emulsifying substances which are able considerably to simplify incorporation of the gelling agents and of the other additives, are of particular importance in this respect. In addition to the non-ionic compounds, which are generally addition products of alkylene oxides such as ethylene oxide with hydrophobic siloxanes, copolymers of ethylene oxide and propylene oxide, fatty acids, fatty alcohols or phenols, reference is made by way of preference to alkyl sulfonates having 10 to 18 carbon atoms in the alkyl radical which are highly compatible with the silicate solutions and which have a good emulsifying effect on systems with a continuous phase, coupled with a good foaming effect. These auxiliaries are used either in pure form or, preferably, in the form of aqueous solutions or dispersions or even in the form of solutions in the diluents or gelling agents. They can be present in the reaction mixture in quantities of about 0.05 to 20% by weight. Quantities of about 0.1 to 15% by weight are preferred. In special cases, for example where the required moldings are intended to have a highly hydrophilic character or to be used as supports for these substances, these quantities can be exceeded.

The gelation mechanism of the silicate solution optionally containing inorganic or organic additives is not the primary characteristic of the process, because in principle it is possible to apply any gelling method providing it leads to a compact, water-containing silicate gel.

For example, a waterglass solution can be concentrated by evaporating an adequate quantity of water or by adding more alkali silicate, to such an extent that it is still plastic or even liquid under heat, i.e. it can absorb the expanding agent added (optionally under pressure), but in the cold or at temperatures below 50° C. for example it solidifies to form a solid gel which can be subsequently foamed.

However, gelation is preferably induced by adding a gelling agent. It is also possible to use mixtures of different gelling agents in order to obtain a variety of thickening and hardening times.

Gelling agents suitable for use in the process according to the invention can be solid, liquid or gaseous, inorganic or organic compounds. However, it is preferred to use solid or, in particular, liquid gelling agents or gelling agent mixtures or solutions by virtue of their favorable handling properties. The gelling agent may be used in an amount between about 0.5% and 20% by weight, based on the reaction temperature.

Suitable gelling agents of this kind include complexes of the kind described in German Offenlegungsschrift No. 2,114,334, salt-like or acid or other gelling compounds of the kind described in U.S. Patent Specification No. 1,944,008 and French Patent Specification No. 2,055,341, and also other inorganic and organic compounds such as metal salts of organic or inorganic acids or these acids themselves, Lewis acids, halides of the elements of Groups 2 to 8 of the Periodic System, oxyhalides, thiochlorides, for example phosphorus thiochloride, phosgene, esters of phosphoric acids such as trimethyl phosphate for example, or of sulfuric acids such as dialkyl sulfonates, dimethyl sulfoxide, amides of inorganic or organic acids such as hexamethyl phosphoric acid triamide, dimethyl formamide, vinyl or methyl pyrrolidone, acrylamide, esters or lactones of acids such as glycerin nitrate, glycerin triacetate, vinyl acetate, esters of formic acid or maleic acid such as ethyl or methyl formate or dimethyl maleate, esters of chloroacetic acids or of cyano acetic acid such as chloroethyl or trichloroethyl acetate or ethyl cyano acetate, esters of chloroformic acid with aliphatic or aromatic hydroxyl compounds, for example with ethanol, glycol, glycerin, trimethylol propane, pentaerythritol, phenol or hydroquinone, amides of chloroformic acid such as N,N-dimethyl carbamic acid chloride, aromatic or aliphatic acid chlorides such as benzoyl chloride, sym.- or asym.-phthalyl chloride, cinnamic acid chloride, acetyl chloride or oleic acid chloride, chlorides of phosphonic or sulfonic acids such as tosyl chloride or benzene sulfochloride, aliphatic or aromatic optionally further substituted isocyanates such as octyl isocyanate, hexamethylene diisocyanate or tolylene diisocyanate, mixed or non-mixed acid anhydrides of inorganic and/or organic acids such as phthalic acid anhydride, methyl hexahydrophthalic acid anhydride or aceticanhydride, dialkyl dicarbonates, carboxylic acid-carbonic acid mixed anhydrides, alcohols such as methanol, ethanol, isopropanol, t-butanol, glycol, glycerin, ethanolamines, ethers such as polyalkylene glycols, ketones such as acetone, methylethyl ketone, heterocyclic halogen compounds such as cyanuric chloride or isopropoxy dichloro-s-triazine, cyclic carbonates such as 1,2-propylene glycol carbonate, glycol carbonate and others. It is of course also possible to use mixtures of gelling agents, for example in order to control the time required for the gelling process.

The gelling effect of compounds such as these can generally be tested very easily, for example by stirring sodium waterglass solution with a solids content of about 38% by weight at room temperature with approximately 0.5% by weight of an emulsifier, for example $C_{14}$-alkyl sulfonate, an approximately 10% by weight of the substance to be tested for its gelling effect.

According to the invention, it is preferred to use gelling agents of the kind which, when subjected to this test, give gelling times of less than 120 minutes. Gelling agents of this kind include inter alia all the compounds directly specified in the exemplary list.

The expanding agent and then the gelling agent or first the gelling agent and then the expanding agent can be added to the aqueous silicate solution optionally containing inorganic or organic additives and an emulsifying aid. In many cases, it is advisable to mix in the expanding agent and gelling agent together or simultaneously, optionally with the emulsifier and/or the diluent added. It is also possible to charge an organic or inorganic filler with expanding agent, emulsifier and/or gelling agent, followed by decomposition.

Mixing is generally carried out at temperatures of about 0° C. to 70° C. and preferably at temperatures of about 10 to 30° C. However, these temperature limits which do not restrict the process in any way can also be exceeded in either direction where it would appear advisable to do so within the context of the particular process used.

Mixing can be carried out continuously or in batches, in stirring, vibrating or kneading machines for example.

The gelling mixture can be poured in free-flowing or plastic form into molds and processed into panels or tapes or other moldings so that it solidifies in this form. The resulting moldings can be directly foamed or, for example, granulated advantageously into granulates with average granulate diameters of about 0.5 to 50 mm., preferably about 2 to 20 mm., and the resulting granulates introduced into molds and then foamed. During foaming, the granulate particles weld together and form a coherent molding which either consists of welded, foamed granulate particles or comprises a substantially consolidated outer skin having a uniform, cellular core, scarcely showing the original granulate structure.

The type of molding obtained can largely be controlled by the composition, the foaming temperature and the shape of the mold. This also applies as regards the unit weight obtained which is predominantly in the range of about 0.05 to 0.9 g./cc., based on the molding as a whole.

Generally, it can be said said that the unit weight is lower and, in the case of granulate foaming, welding of the granulate particles is better, the smaller the quantity of gelling agent used and the smaller the quantity of the solid inorganic and/or organic additives introduced, and the higher the quantity of volatile diluents and expanding agents used and the higher the foaming temperature.

In the process according to the invention, foaming is carried out by heating the solidified gel to temperatures above about 70° C. and preferably to temperatures in the range of about 90 to 220° C. However, the heating process can also be controlled through different temperature stages in which much higher temperatures, up to about 1200° C. and higher, can be used.

Heating can be carried out, for example, by applying high frequency, micro waves by infra-red radiation, in a heating bath, by heating with steam or other vapors or by hot air. Naturally, combined processes can also be used. Heating may also be accompanied or followed by a treatment with acid gases such as $CO_2$, HCl, $SO_2$, polymerizable monomers such as styrene or acrylic esters or acrylic acid, or with solvents.

Foaming can be carried out, for example, either by foaming the optionally preformed silicate-based gel directly, i.e. without using a mold, followed if necessary by shaping, or by introducing the gel optionally in granulate form or as a preform into a suitable mold which it fills.

These molds are best designed in such a way as to allow the steam to escape and the optional heat-transfer medium, for example hot air, to enter. Examples of molds suitable for this purpose include perforated molds or molds of wire netting or porous materials such as metals, ceramics or even plastics or cardboard, paper and the like.

In many cases, it is advisable to finish the mold with a release agent based on natural or synthetic fats or silicones of fluorine compounds. The mold can also be lacquered or coated; molds coated with fluorine plastics having proved to be particularly suitable.

The molds obtained in this way can be used in dry or moist form, optionally after consolidation or tempering (optionally under pressure), as insulating materials, space-filling materials, packaging materials, building materials showing high resistance to solvents and favorable fire-proof properties. They can also be used in the form of tubes, hollow bodies, lightweight components, optionally in the form of sandwich elements, for example with metal surface layers, bituminous or plastics surface layers in house, vehicle and aircraft construction.

They can also be used in admixture as fillers for gypsum, concrete, polyester-, formaldehyde-, polyepoxide- or polyurethane-cast resin systems which can contain large quantities of the dried or even water-containing hardened silicate foam particles so that they show considerable heat stability and insulating properties or favorable fireproof properties.

Any given webs, woven fabrics, lattices, structural elements or other permeable structures of foamed or unfoamed material can also be foamed simultaneously with the silicate gels so that it is possible in this way to obtain composite foams with special properties, for example favorable fireproof properties, which may optionally be directly used as structural elements in the building, furniture or motor vehicle and aircraft sector.

The moldings which can be obtained by the process according to the invention can be added to soil in the form of crumbs, optionally enriched with fertilisers and plant-protection agents, in order to improve its agrarian consistency.

Since the foam moldings obtained by the process according to the invention can show considerable porosity after drying, they are also suitable for use as drying agents because they can absorb water. However, they can also be charged with active substances or used as catalyst supports.

Auxiliaries optionally used in or subsequently introduced into the gelling mixture, such as emulsifiers, surface-active substances, dispersants, wetting agents, odorants and substances to increase water repellency, enable the properties of the moldings in their water-containing or dried form to be adjusted as required.

The foam moldings in their water-containing or dried or impregnated form can be subsequently lacquered, coated, laminated, galvanised, subjected to vapour deposition, bonded or flocked. The moldings can be subjected to further shaping in their water-containing or dried form, for example by sawing, milling, drilling, planing, polishing and other machining operations.

The optionally filled foam moldings can be further modified in their properties by aftertreatment under heat, carbonization, oxidation processes, hot-pressing, sintering processes or surface melting or other consolidation processes.

The foam moldings can also be aftertreated in their moist or dry form by rinsing or impregnating with aqueous or non-aqueous acid, neutral or basic liquids or gases, for example hydrochloric acid, phosphoric acid, formic acid, acetic acid, ammonia, amines, organic or inorganic salt solutions, lacquer solutions, solutions of polymerizable or already polymerized monomers, dye solutions, galvanizing baths, solutions of catalysts or preliminary catalyst stages, or odorants.

The preceding paragraphs are intended to illustrate the general possibilities of producing foam moldings by the process according to the invention.

The process according to the invention is illustrated in the following examples. The parts quoted are parts by weight unless otherwise stated.

EXAMPLES

Without being in any way complete so far as the gelling agents are concerned, Examples 1 to 18 set out below in the form of a Table are intended to show that a variety of different types of gelling agent can be used in the process according to the invention. The same also applies as regards the expanding agents and additives.

In all cases, the silicate solutions used were modified in such a way that they contained 0.5% by weight of alkyl sulfonate (Mersolat®) in solution in order to make the mixing process easier. The $SiO_2$ source, the additives, the expanding agents and the gelling agents are specified in the Table under A, B, C and D, respectively.

The silicate solution was initially introduced, followed if necessary by the fillers and then by the expanding and gelling agents.

In Examples 1 to 4, mixing was carried out by means of a kneader, while in Examples 5 to 18 mixing was carried out by means of a propeller stirrer.

In Examples 1 to 4, the dough-like mass obtained was screw-extruded through a slotted die to form an approximately 2 cm. thick panel. After 8 hours, this panel in its solidified form was placed in a hot air cabinet with the temperature specified for foaming (foaming temperature).

After about 8 hours, the foamed panel was dry and could be machined, nailed, screwed or coated. It could be used as a waterproof, non-inflammable insulating material.

When a panel of this kind was introduced unfoamed into a microwave oven, the foaming and drying process took place much more quickly, in addition to which unit weights some 30% lower were obtained. The same also applies as regards foaming and drying in the case of Examples 5 to 18.

The mixtures obtained in accordance with Examples 5 to 18 were solidified either in the form of a strand or in the form of a block. The solidified material was then granulated or ground, a grain spectrum with average grain diameters of from 2 mm. to 20 mm. being used for the foaming tests.

The resulting granulates were introduced into a cylindrical mold consisting of Teflon-coated wire gauze to such an extent that approximately 30% of the mold was filled. The molds were then transferred into a hot-air oven with a temperature specified and removed again after about 8 hours.

The granulates welded together during the foaming process, substantially filling the mold. When the moldings obtained were cut open, they were found to consist of an impervious, solid jacket zone as the outer skin, being internally filled with a silicate foam most of the pores of which were closed so that it had a good insulating effect.

Instead of the cylindrical mold, it was also possible to use a panel mold or a hollow mold, for example in order to produce tubes or hollow bodies from the material.

When the quantity of gelling agent was increased by 20%, for example as in Example 9 or 12, the granulate particles, although again foaming, no longer welded together, but instead only stuck together so that the molding obtained consisted of foam granulate particles spot-welded (sintered) together.

The unfoamed granulates could also be individually foamed by passing them on a belt through a hot air or hot steam oven. In this case foam granulates were formed which could be used as filler for gypsum, cement or organic cast resins.

| Example number | 1 | 2 | 3 | 4 | 5 | 6 | 7 | 8 | 9 | 10 | 11 | 12 | 13 | 14 | 15 | 16 | 17 | 18 | 21 |
|---|---|---|---|---|---|---|---|---|---|---|---|---|---|---|---|---|---|---|---|
| A { Sodium waterglass 30% by weight, parts | 1,500 | | | | | | | | | | | | | | | | | | |
|    Sodium waterglass 38% by weight, parts | | 1,250 | | | 800 | 800 | 800 | 800 | 800 | 800 | 800 | 800 | 800 | 800 | 800 | 800 | 800 | 800 | 800 |
|    Sodium waterglass 48% by weight, parts | | | 600 | | | | | | | | | | | | | | | | |
|    Potassium waterglass 35% by weight, parts | | | | 125 | | | | | | | | | | | | | | | |

TABLE—Continued

| Example number | | 1 | 2 | 3 | 4 | 5 | 6 | 7 | 8 | 9 | 10 | 11 | 12 | 13 | 14 | 15 | 16 | 17 | 18 | 21 |
|---|---|---|---|---|---|---|---|---|---|---|---|---|---|---|---|---|---|---|---|---|
| B | Polyester fibers, parts | | | | | | | | | | | | | | | | | 30 | | |
| | Asbestos fibers, parts | 300 | | 170 | 30 | 20 | | 20 | 20 | 20 | 20 | 20 | 20 | 20 | 30 | 20 | 15 | | | 180 |
| | Glass fibers, parts | | 100 | | | | | | | | | | | | | | | | | | |
| | Chalk, parts | | 300 | | | | | | | | | | | | | | | 200 | | | |
| | Polystyrene beads (with 5% pentane), parts | | | | | | | | | | | | | | | | | 200 | | | |
| C | Petroleum ether, parts | | 40 | 20 | | 10 | 10 | | 10 | 10 | 20 | | | | | | | 10 | | 15 | |
| | Light petrol, parts | 50 | | 30 | 5 | | | 10 | | 10 | | 15 | 10 | 25 | 15 | 15 | | | | | 40 |
| | Butyl acetate, parts | | | | 3 | | | | 10 | | | | | | | | | | | | |
| | Trichloroethylene, parts | 30 | | | | | | | | | | 10 | | | | | | | | | |
| | Trichlorofluoromethane, parts | | | | 20 | | | | | | | | | | | | | | | | |
| | Ethyl dimethyl phosphate, parts | | | | | | | | 10 | | | | | | | | | | | | |
| | Diethyl dicarbonate, parts | | | | | 31 | 40 | | | | | | | | | | | 30 | | | |
| | Isophthalic acid-dicarbonic-acid ethylic ester anhydride, parts | 35 | | 30 | | | | | | | | | | | | | | | | | 35 |
| | Sodium silicofluoride, parts | | 15 | | | | | | | | | | | | | | | | | | |
| | Phosphorous thiochloride, parts | | | | | | | 3 | | | | | | | | | | | | | |
| | Dimethyl sulfate, parts | | 5 | | | | | | | | | | | | | | | | | | |
| | Chloroformic acid ethyl ester, parts | | | | | | | | | 20 | | | | | | | | | | | |
| | Benzoylchloride, parts | | | | | | | | | | 28 | | | | | | | | | 30 | |
| D | sym. Phthaloyl chloride, parts | | | | | | | | | | | 5 | | | | | | | | | |
| | Methyl hexahydrophthalic acid anhydride, parts | | | | | | | | | | | | 30 | | | | | | | | |
| | Ethyl chloroacetate, parts | | | | | | | | | | | | 5 | | | | | | 10 | | |
| | Glycol diacetate, parts | | | | | | | | | | | | | 15 | | | | | | | |
| | Dimethyl maleate, parts | | | | 10 | | | | | | | | | | | | | 25 | | | |
| | Dimethyl carbamide chloride, parts | | | | | | | | | | | | | 15 | | | | | | | |
| | Tosyl chloride, parts | | | | | | | | | | | | | | 30 | | | | | | |
| | Dimethyl sulfoxide, parts | | | | | | | | | | | | | | 5 | | | | | | |
| | Vinyl acetate, parts | | | | | | | | | | | | | | | 30 | | | | | |
| | Glycerine triacetate, parts | | | | | | | | | | | | | | | 30 | | | | | |
| | Ethyleneglycol dichloroformate, parts | | | | | | | | | | | | | | | | 15 | | | | |
| Gelling temperature, °C | | 20 | 18 | 15 | 19 | 25 | 20 | 20 | 10 | 20 | 20 | 17 | 25 | 40 | 25 | 15 | 23 | 20 | 25 | 20 |
| Foaming temperature, °C | | 160 | 150 | 170 | 160 | 160 | 130 | 180 | 160 | 160 | 160 | 190 | 160 | 180 | 160 | 120 | 95 | 130 | 160 | 150 |
| Density (dry) g./cm.³ | | 0.2 | 0.15 | 0.18 | 0.12 | 0.2 | 0.15 | 0.25 | 0.3 | 0.28 | 0.35 | 0.4 | 0.3 | 0.1 | 0.11 | 0.31 | 0.15 | 0.25 | 0.3 | 0.18 |

Example 19

800 parts of an approximately 40% soda waterglass solution were kneaded at 50° C. with 100 parts of asbestos fibers, 400 parts of solid sodium silicate, 3 parts of sodium alkyl sulphonate and 20 parts of light gasoline, to form a plastic mass. This mass was extruded warm through a single-hole die to form a strand which was cooled to 15° C. immediately after the die. A hard gel was formed. This gel was granulated and introduced into a drying oven at a temperature of 130° C. The granulate foamed in this oven into foam granulate and could be used as a mixture constituent in concrete, gypsum or cast resins. The granulate particles had an average density of 0.9 g./cc.

Example 20

800 parts of approximately 35% soda waterglass were thoroughly stirred with 20 parts of asbestos. 20 parts of finely powdered azodiisobutyronitrile, 2 parts of diethyl carbonate and 31 parts of benzene sulfochloride were then mixed in by means of a turbo mixer. This mixture was allowed to solidify in a panel mold, and after 24 hours the panel was heated to approximately 160° C. in a hot-air cabinet. The panel foamed into a foam with a total unit weight, i.e. measured over the entire piece of foam, of approximately 0.1 g./cc.

When part of the unfoamed panel was granulated, the granulate could be expanded, and the granulate particles welded, in a cylindrical mold of brass wire, to form a foam of similar density.

What is claimed is:

1. Process for the production of foam having a silicate skeleton which comprises mixing an aqueous silicate solution with a gelling agent and a foaming agent which liberates a volatile substance above about 70° C., based on the mixture the silicate content being between about 5 and 50% by weight, the gelling agent being between about 0.5 and 20% by weight and the foaming agent being between about 0.5 and 20% by weight, converting said mixture into a gel and then heating said gel to a temperature sufficient to effect volatilization of said foaming agent, thereby foaming said mixture.

2. Process according to claim 1, wherein said aqueous silicate solution contains up to about 85% by weight of at least one inert organic or inorganic filler.

3. Process according to claim 2, wherein said filler comprises at least one member selected from the group consisting of asbestos, magnesium oxide, dolomite, chalk, talcum, glass in foamed or fibrous form, carbon, polystyrene, polyvinyl chloride and polyethylene in foamed or unfoamed form, terephthalic acid polyester, polyacrylonitrile, polyamides, polypropylene and polyurethanes.

4. Process according to claim 1, wherein said foaming agent comprises a volatile organic compound boiling at about 15° C. to 150° C.

5. Process according to claim 1, wherein said foaming agent is at least one member selected from the group consisting of light petrol, petroleum ether, benzene, toluene, xylene, methyl chloride, chloroform, and petrol fractions.

6. Process according to claim 1, wherein said gelling agent comprises at least one chloroformic acid ester.

7. Process according to claim 6, wherein said gelling agent is isophthalic acid-di-carbonic acid ethyl ester anhydride.

8. Process according to claim 1, wherein said water-soluble silicate is a sodium waterglass solution ($Na_2O$ 8.6%, $SiO_2$ 25.9%), said gelling agent is isophthalic acid-di-carbonic acid ethyl ester anhydride and said foaming agent is light petrol.

9. Process according to claim 8, wherein the silicate content of the mixture is about 10 to 30% by weight, the content of the gelling agent is about 1 to 10% by weight and the content of the foaming agent is about 1 to 10% by weight, the gel solidifying prior to foaming.

(References on following page)

References Cited

UNITED STATES PATENTS

| | | | |
|---|---|---|---|
| 3,095,312 | 6/1963 | Holmes | 106—75 |
| 3,351,569 | 11/1967 | Revallier et al. | 264—53 X |
| 3,574,646 | 4/1971 | Wismer et al. | 106—41 |
| 3,433,700 | 3/1969 | Migdol et al. | 161—160 |
| 2,029,311 | 2/1936 | Elias | 106—75 |
| 1,944,007 | 1/1934 | Hobart | 106—75 |
| 1,944,008 | 1/1934 | Hobart | 106—75 |
| 3,219,684 | 11/1965 | Windholz | 260—463 |

ROBERT L. LINDSAY, JR., Primary Examiner

W. F. SMITH, Assistant Examiner

U.S. Cl. X.R.

106—75; 264—42, 53